United States Patent
Wu et al.

(10) Patent No.: US 12,333,187 B2
(45) Date of Patent: Jun. 17, 2025

(54) METHOD AND DEVICE FOR PROCESSING READ COMMAND, CONTROLLER, AND STORAGE MEDIUM

(71) Applicant: INNOGRIT TECHNOLOGIES (NANJING) CO., LTD., Nanjing (CN)

(72) Inventors: Jian Wu, Nanjing (CN); Dishi Lai, Nanjing (CN); Zhihong Wang, Nanjing (CN); Changjiang Xue, Nanjing (CN)

(73) Assignee: INNOGRIT TECHNOLOGIES (NANJING) CO., LTD., Nanjing (CN)

( * ) Notice: Subject to any disclaimer, the term of this patent is extended or adjusted under 35 U.S.C. 154(b) by 168 days.

(21) Appl. No.: 18/232,528

(22) Filed: Aug. 10, 2023

(65) Prior Publication Data
US 2024/0053926 A1 Feb. 15, 2024

(30) Foreign Application Priority Data
Aug. 11, 2022 (CN) .......................... 202210963125.9

(51) Int. Cl.
G06F 3/06 (2006.01)
(52) U.S. Cl.
CPC .......... G06F 3/0659 (2013.01); G06F 3/0679 (2013.01); *G06F 3/0604* (2013.01)
(58) Field of Classification Search
CPC .... G06F 3/0659; G06F 3/0679; G06F 3/0604; G06F 3/0656; G06F 3/061; G06F 3/0638; G06F 3/0658
See application file for complete search history.

(56) References Cited

U.S. PATENT DOCUMENTS

| | | | |
|---|---|---|---|
| 2017/0329684 A1* | 11/2017 | Lien | G06F 3/0619 |
| 2019/0303314 A1* | 10/2019 | Li | G06F 3/061 |
| 2022/0100681 A1* | 3/2022 | Chen | G06F 12/0824 |

OTHER PUBLICATIONS

Markussen, Jonas, et al. "Smartio: Zero-overhead device sharing through pcie networking." ACM Transactions on Computer Systems (TOCS) 38.1-2 (2021): 1-78. (Year: 2021).*

\* cited by examiner

*Primary Examiner* — Nicholas J Simonetti
(74) *Attorney, Agent, or Firm* — WOMBLE BOND DICKINSON (US) LLP

(57) ABSTRACT

The present disclosure relates to a method and a device for processing a read command, a controller, and a storage medium, comprising determining at least one read command and a command index number; acquiring a flash memory data unit and data unit information corresponding to each of the read commands, the data unit information comprising a data unit index number and the command index number; searching for a corresponding address entry in an address entry buffer based on the data unit information, the address entry buffer comprising at least one buffer unit storing the address entry with the corresponding data unit information; and in response to finding an address entry corresponding to the data unit information, transmitting the flash memory data unit to a corresponding host memory address in the address entry and storing the flash memory data unit therein.

20 Claims, 4 Drawing Sheets

METHOD AND DEVICE FOR PROCESSING READ COMMAND, CONTROLLER, AND STORAGE MEDIUM

CROSS-REFERENCE TO RELATED APPLICATION

The present application claims priority to Chinese Patent Application No. 202210963125.9, filed on Aug. 11, 2022, which is incorporated herein by reference in its entirety.

TECHNICAL FIELD

The present disclosure relates to the field of data storage, in particular to a method and a device for processing a read command, a controller, and a storage medium.

BACKGROUND

Non-Volatile Memory Express (NVMe) is a bus transfer protocol based on the logic interface to the device. It specifies a standard protocol for accessing non-volatile memory media, such as Solid-State Drives (SSDs) using NAND Flash Memory, over a bus such as the PCIe bus protocol, and is a protocol for communication between a host and an SSD. Currently, when the NVMe controller executes data read commands, a single NAND flash channel may be connected with a plurality of logic units that simultaneously receive and execute different read commands in order to increase the capacity of the storage device. Therefore, in the case of executing a plurality of read commands, there may be a situation where a plurality of different commands is executed in parallel in different logic units. Since the NVMe protocol supports out-of-order execution of commands, the controller may execute commands in any order and return the results. Based on the characteristics of the read command execution process described above, it is currently difficult to obtain the host memory addresses of each read command's data and return the corresponding data in a timely and efficient manner.

SUMMARY

In view of the above, the present disclosure provides a method and a device for processing read commands, a controller, and a storage medium, aiming at optimizing address entry management when executing a plurality of read commands and improving the efficiency of the whole command processing process.

According to a first aspect of the present disclosure, there is provided a method for processing a read command, comprising:
  determining at least one read command and a command index number corresponding to each read command;
  acquiring at least one flash memory data unit and data unit information corresponding to each read command, the flash memory data unit representing data read based on the read command, the data unit information comprising a data unit index number and the command index number;
  searching for an address entry corresponding to the data unit information in an address entry buffer based on the data unit information, the address entry buffer comprising at least one buffer unit, the buffer unit comprising at least one address entry with corresponding data unit information; and
  in response to finding an address entry corresponding to the data unit information, transmitting each flash memory data unit to a corresponding memory space pointed by the address entry and storing each flash memory data unit therein, based on the address entry.

In one possible implementation, the determining at least one read command and a command index number corresponding to each read command comprises:
  reading at least one read command from a host memory;
  determining a unique corresponding command index number for each read command that has been read, and storing the at least one read command and the corresponding command index number in a command buffer; and
  acquiring at least one read command and a command index number corresponding to the read command from the command buffer.

In one possible implementation, the acquiring at least one flash memory data unit and data unit information corresponding to each read command comprises:
  determining at least one read request corresponding to each read command, and a data unit index number corresponding to each read request, each read request being configured to acquire one flash memory data unit; and
  reading a corresponding flash memory data unit and data unit information corresponding to the flash memory data unit in a flash memory controller based on a data unit index number and a command index number corresponding to each read request, the data unit information comprising the data unit index number and the command index number.

In one possible implementation, the buffer unit comprises at least one subunit arranged in the order of logic address. Each subunit stores at least one address entry, a significant bit, and a last entry indication bit, wherein the last subunit in the buffer unit comprises a host memory address corresponding to the next buffer unit.

In one possible implementation, the searching for an address entry corresponding to the data unit information in an address entry buffer based on the data unit information comprises:
  determining a candidate buffer unit based on a host memory address corresponding to the data unit information; and
  searching for an address entry corresponding to the data unit information in each candidate buffer unit based on the data unit information.

In one possible implementation, the method further comprises:
  in response to completing storage of the flash memory data unit, clearing significant bits of the address entry corresponding to the flash memory data unit in the buffer unit.

In one possible implementation, the method further comprises:
  in response to not finding an address entry corresponding to the data unit information, acquiring at least one address entry from the host memory based on the data unit information, and storing the at least one address entry and the corresponding data unit information in the address entry buffer.

In one possible implementation, the acquiring at least one address entry from a host based on the data unit information comprises:

calculating a host memory address of a corresponding buffer unit in the host based on the data unit information; and acquiring a preset number of adjacent address entries from the host based on the host memory address and a preset acquisition rule, and determining data unit information corresponding to each address entry.

In one possible implementation, the acquiring a preset number of adjacent address entries from the host based on the host memory address and a preset acquisition rule, and determining data unit information corresponding to each address entry comprises:

determining an empty target buffer unit among buffer units included in the address entry buffer, the target buffer unit being configured to store the acquired address entries;

determining the number of the address entries based on a memory space of the target buffer unit and a memory occupied by each address entry; and starting from the current address entry's host memory address, sequentially acquiring consecutive address entries of the preset number, and calculating data unit information corresponding to each address entry based on the data unit information corresponding to the host memory address.

In one possible implementation, the buffer unit in the address entry buffer has a corresponding buffer unit index number, and the buffer unit index number is in direct proportion to the location of the buffer unit;

wherein the determining an empty target buffer unit among buffer units included in the address entry buffer comprises:

in response to the presence of empty buffer units in the address entry buffer, determining an empty buffer unit with the smallest buffer unit index number as a target buffer unit.

In one possible implementation, the determining an empty target buffer unit among buffer units included in the address entry buffer comprises:

in response to the absence of empty buffer units in the address entry buffer, defining a 1-bit phase value for each buffer unit, clearing the buffer unit with the smallest buffer unit index number in the same phase value, and determining the buffer unit as a target buffer unit and inverting the phase value of the target buffer unit.

According to a second aspect of the present disclosure, there is provided a device for processing a read command, comprising:

a command acquisition module configured to determine at least one read command and a command index number corresponding to each read command;

a data acquisition module configured to acquire at least one flash memory data unit and data unit information corresponding to each read command, the flash memory data unit being configured to represent data read based on the read command, the data unit information comprising a data unit index number and the command index number;

an address entry search module configured to search for an address entry corresponding to the data unit information in an address entry buffer based on the data unit information, the address entry buffer comprising at least one buffer unit, the buffer unit comprising at least one address entry with corresponding data unit information; and a data storage module configured to, in response to finding an address entry corresponding to the data unit information, transmit the data unit to a corresponding memory space address pointed by the address entry and store the data unit therein, based on the address entry.

In one possible implementation, the command acquisition module comprises:

a command reading submodule configured to read at least one read command from a host memory;

a command storage submodule configured to determine a unique corresponding command index number for each read command that has been read, and store the at least one read command and the corresponding command index number in a command buffer; and a command acquisition submodule configured to acquire at least one read command and a command index number corresponding to the read command from the command buffer.

In one possible implementation, the data acquisition module comprises:

a request determination submodule configured to determine at least one read request corresponding to each read command and a data unit index number corresponding to each read request, each read request being configured to acquire a flash memory data unit; and a data reading submodule configured to read a corresponding flash memory data unit and data unit information corresponding to the flash memory data unit in a flash memory controller based on a data unit index number and a command index number corresponding to each read request, the data unit information including the data unit index number and the command index number.

In one possible implementation, the buffer unit comprises at least one subunit arranged in order. Each subunit stores at least one address entry, a significant bit, and a last entry indication bit, wherein the last subunit in the buffer unit comprises a host memory address corresponding to the next buffer unit.

In one possible implementation, the address entry search module comprises:

a unit determination submodule configured to determine a candidate buffer unit based on a host memory address corresponding to the data unit information; and an address entry search submodule configured to search for an address entry corresponding to the data unit information in each candidate buffer unit based on the data unit information.

In one possible implementation, the device further comprises:

a significant bit clearing module configured to clear significant bits of the address entry corresponding to the flash memory data unit in the buffer unit in response to completing storage of the flash memory data unit.

In one possible implementation, the device further comprises:

an address entry updating module configured to acquire at least one address entry from the host based on the data unit information, and store the at least one address entry and corresponding data unit information in the address entry buffer, in response to not finding an address entry corresponding to the data unit information in the address entry buffer.

In one possible implementation, the address entry updating module comprises:

an address determination submodule configured to calculate a host memory address of a corresponding address entry in the host memory based on the data unit information; and an address entry acquisition submodule configured to acquire a preset number of adjacent address entries from the host based on the host memory address and a preset acquisition rule, and determine data unit information corresponding to each address entry.

In one possible implementation, the address entry acquisition submodule comprises:

a buffer index determination unit configured to determine an empty target buffer unit among buffer units included in the address entry buffer, the target buffer unit being configured to store the acquired address entries;

an address entry determination unit configured to determine the number of the address entries based on the total space of the target buffer unit and the space occupied by each address entry; and an address entry acquisition unit configured to sequentially acquire consecutive address entries of the determined number, starting from the host memory address of the first address entry to obtain, and calculate data unit information corresponding to each address entry based on data unit information corresponding to the host memory address.

In one possible implementation, the buffer unit in the address entry buffer has a corresponding buffer unit index number, and each buffer unit index number and each buffer unit are one-to-one correspondent; and the index determination unit comprises:

a first index determination subunit configured to determine the empty buffer unit with the smallest buffer unit index number as a target buffer unit in response to the presence of empty buffer units in the address entry buffer.

In one possible implementation, the index determination unit comprises:

a second index determination subunit configured to define a 1-bit phase value for each buffer unit, clear the buffer unit with the smallest buffer unit index number in the same phase value, and determine the buffer unit as a target buffer unit and invert the phase value of the target buffer unit, in response to the absence of empty buffer units in the address entry buffer.

According to a third aspect of the present disclosure, there is provided a controller, comprising a command control module for storing at least one read command and a corresponding command index number;

a read command execution module configured to execute the read command and acquire a flash memory data unit and data unit information corresponding to the read command;

an address entry buffer module comprising at least one buffer unit, each buffer unit being configured to store at least one address entry with corresponding data unit information; and an address entry search module configured to search for a corresponding address entry in the address entry buffer module based on the data unit information.

According to a fourth aspect of the present disclosure, there is provided a nonvolatile computer readable storage medium stored with computer program instructions thereon, wherein when the computer program instructions are executed by a processor, a controller in the processor implements the above method.

According to a fifth aspect of the present disclosure, there is provided a computer program product, comprising a computer readable code, or a nonvolatile computer readable storage medium carrying the computer readable code. When the computer readable code runs in a processor of an electronic apparatus, a controller in the electronic apparatus executes the above method.

In the embodiment of the present disclosure, by determining at least one read command and a corresponding command index number, a flash memory data unit and data unit information corresponding to each read command are acquired, wherein the data unit includes data read based on the read command, and the data unit information includes a data unit index number and a command index number. An address entry corresponding to the data unit information is searched for in the address entry buffer based on the data unit information, and the address entry buffer includes at least one buffer unit storing the address entry with the corresponding data unit information. When the address entry corresponding to the data unit information is found, the data unit is transmitted to a corresponding space address in the address entry and is stored therein. By providing an address entry buffer to effectively manage the address entries, the present disclosure improves the efficiency of acquiring the address entries. By searching for an address entry corresponding to the read command in the address entry buffer, the impact of returning data in disorder is reduced, and thus the overall efficiency of processing the read command is improved.

Other features and aspects of the present disclosure will become evident in light of the following detailed description of exemplary embodiments with reference to the appended drawings.

BRIEF DESCRIPTION OF THE DRAWINGS

The drawings, which are included in and constitute a part of the description, illustrate exemplary embodiments, features and aspects of the present disclosure together with the description and serve to explain the principle of the present disclosure.

DETAILED DESCRIPTION OF THE EMBODIMENTS

Figure 1:
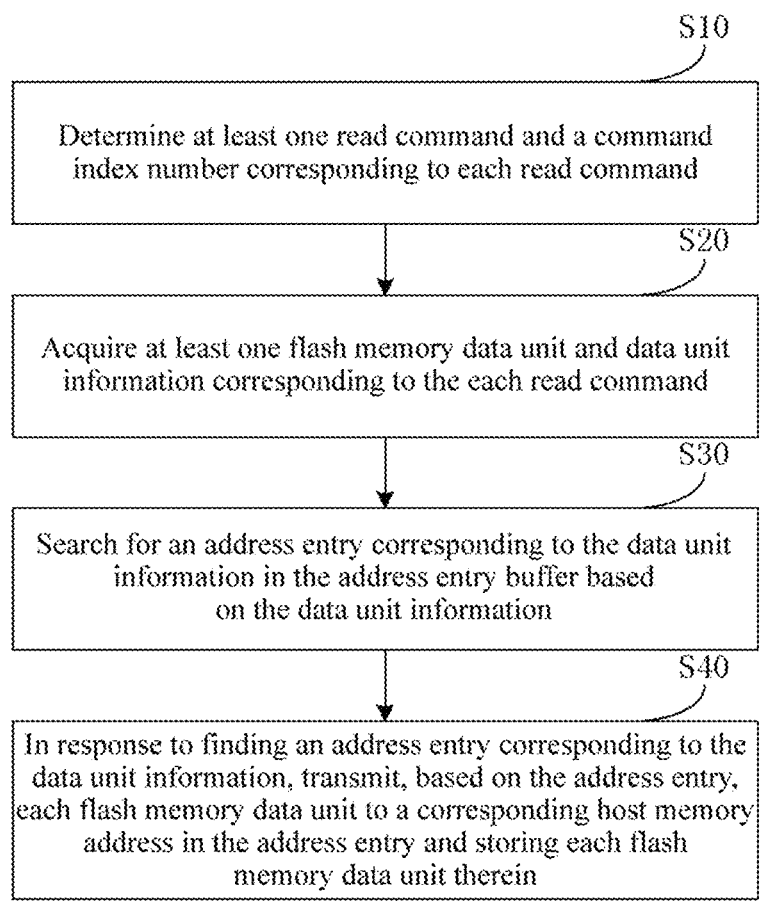
FIG. 1 shows a flowchart of a method of processing a read command according to an embodiment of the present disclosure.

Various exemplary embodiments, features and aspects of the present disclosure will be described in detail below with reference to the drawings. The same reference signs in the drawings denote elements with the same or similar functions. Although various aspects of the embodiments are shown in the drawings, the drawings are not necessarily drawn to scale unless otherwise specified.

The word "exemplary" here means "serving as an example, embodiment or illustration". Any embodiment described herein as "exemplary" is not necessarily to be construed as being superior to or better than other embodiments.

In addition, numerous specific details are given in the specific embodiments below to better illustrate the present disclosure. It should be understood by those skilled in the art that the present disclosure can be implemented equally well without certain specific details. In some examples, methods, means, components and circuits known to those skilled in the art are not described in detail in order to bring out the main thrust of the present disclosure.

A method of processing a read command according to an embodiment of the present application may be executed by a controller capable of controlling data transmission based on a bus generation protocol of a logic interface of a device, wherein the controller may manage a host or perform data transmission between a host and a flash memory. Optionally, the controller may be included in a processor of an electronic device such as a terminal device or server, for managing the host of the electronic device and for performing data transmission between the host and the flash memory of the electronic device.

FIG. 1 shows a flowchart of a method of processing a read command according to an embodiment of the present disclosure. As shown in FIG. 1, the method of processing a read command in the embodiment of the present disclosure may comprise the following steps S10 to S40.

The step S10 comprises determining at least one read command and a command index number corresponding to each read command.

In one possible implementation, a controller determines at least one read command and a command index number corresponding to each read command. The controller may read at least one read command from a host memory, and create a corresponding command index number for each read command acquired in the process of reading read commands. Further, the controller may store each read command and the corresponding command index number in a command buffer, and acquire a corresponding read command for task processing based on the command index number when the read command needs to be processed. That is, the controller may read at least one read command from the host memory. A unique command index number is determined for each read command that has been read, and at least one read command and a corresponding command index number are stored in the command buffer. At least one read command and a command index number corresponding to the read command are acquired from the command buffer. Therefore, at least one read command and a command index number corresponding to each read command may be directly determined by the controller from the host memory or acquired from the command buffer in the controller.

Optionally, the read commands in the embodiment of the present disclosure may be commands corresponding to memories with different organizational forms in the host. One organizational form of the host memory is the Physical Region Page (PRP), and the other is the Scatter Gather List (SGL). Both of the above organizational forms of the host memory can be used to describe a location in the memory where a data unit acquired by executing a read command is to be stored.

By way of example, when the organizational form of the host memory is PRP, the host memory may be divided to form a set of pages, and the page size can be any size such as 4 KB, 8 KB, 16 KB, . . . and 128 MB. The address of PRP may be represented by a 64-bit memory physical address pointer, which includes sequentially arranged base addresses of memory pages, intra-page offset, and a zero value of the last two bits for four-byte alignment.

By way of example, when the organizational form of the host memory is SGL, each SGL is a data space, which may be a space where the data source is located or a data target space. Each SGL comprises a plurality of SGL segments, and each SGL segment comprises a plurality of SGL descriptors, that is, the SGL descriptor is the most basic unit of SGL, which describes a continuous physical memory space through a starting address and a space size. Each SGL descriptor may be 16 bytes in size. Based on the different uses of the SGL descriptors, they can be divided into data descriptors, junk data descriptors, segment descriptors, and last segment descriptors, which are used to index number data unit address, useless data address, next SGL segment address, and last SGL segment address, respectively.

Optionally, the host memories in different organizational forms all point to a data space, and the read commands corresponding to the PRP form and the SGL form may both include the locations of the PRP entries or SGL entries for the corresponding data unit in the host memory. The memory location pointed to by the PRP is a physical page, and the SGL may execute a continuous physical space of an arbitrary size. Both the PRP and the SGL are used to describe a location in the memory, and the locations may be physically continuous or discontinuous. The host sets the PRP or SGL in the read command such that the controller determines the storage location of the corresponding data unit based on the content of the read command. Optionally, the command index number corresponding to each read command may be determined based on the order of acquiring the commands.

The step S20 comprises acquiring at least one flash memory data unit and data unit information corresponding to each read command.

In one possible implementation, after determining each read command, the controller may acquire at least one flash memory data unit and data unit information corresponding to each flash memory data unit from the flash memory controller by executing the read command. The flash memory data unit is configured to represent data read based on the read command, and the data unit information comprises a data unit index number and a command index number, wherein the data unit index number is used for representing the acquisition of the flash memory data unit.

Optionally, as a NAND flash memory channel may be connected to a plurality of logic units that receive and execute different read commands at the same time, one read command may be divided into a plurality of read requests for parallel processing in the process of executing the read commands, so as to improve the reading efficiency of the data unit. That is, the controller may determine at least one read request corresponding to each read command and a data unit index number corresponding to each read request, and each read request is used to acquire a flash memory data unit. A corresponding flash memory data unit and data unit information corresponding to the flash memory data unit are read in the flash memory controller based on the data unit index number and the command index number corresponding to each read request. The data unit information comprises a data unit index number and a command index number. The data unit index number may be determined by acquiring the data unit of the read request.

Optionally, the process of dividing a read command to acquire at least one read request and acquiring a flash memory data unit and data unit information corresponding to each read request by the controller may be carried out by the Direct Memory Access (DMA) included in the controller. After dividing a read command to acquire at least one read request, the DMA may assign a corresponding data unit index number to each read request, send the read request together with the corresponding command index number and data unit index number to the NAND flash memory controller, and receive a corresponding flash memory data unit returned by the NAND flash memory controller, and data unit information including a data unit index number and a command index number corresponding to the flash memory data unit. Optionally, the data unit information may further include an offset of the flash memory data unit corresponding to the read request in the data unit, which is used to represent an offset position of the flash memory data unit in the data unit.

According to the embodiment of the present disclosure, it is possible to ensure the correspondence between the data unit to be read and the data unit information through the above data unit information exchange mode, which reduces the possibility of data confusion when simultaneously acquiring a plurality of flash memory data units and data unit information, and improves the reliability and efficiency of the data acquisition process.

The step S30 comprises searching for an address entry corresponding to the data unit information in the address entry buffer based on the data unit information.

In one possible implementation, after acquiring a data unit and corresponding data unit information, the controller searches for a corresponding address entry in the address entry buffer of the controller based on each data unit information, wherein the address entry is used to indicate a physical address where the data in the data unit corresponding to the data unit information is stored in the host memory. The address entry buffer may be a buffer provided in the address entry buffer module in the controller, which may comprise at least one buffer unit. The buffer unit is configured to store address entries, each address entry having a corresponding relationship with data unit information. That is, each buffer unit may comprise at least one address entry with corresponding data unit information.

Optionally, each buffer unit in the address entry buffer has a corresponding host memory address, and the buffer unit further comprises at least one subunit arranged in order. Each subunit stores at least one address entry, a significant bit, and a last entry indication bit, wherein the last subunit in the buffer unit comprises a host memory address corresponding to the next buffer unit. Optionally, the address entry stored in the buffer unit may include a PRP address entry or an SGL address entry.

By way of example, in the case where the entries stored in the buffer unit are PRP address entries, the structure of the buffer unit may be defined as shown in Table 1 below.

TABLE 1

| Number of Bits | 140:132 | 131 | 130 | 129 | 128 | 127:64 | 63:0 |
|---|---|---|---|---|---|---|---|
| 0 | Parity bits | Last entry indication bit | Last entry indication bit | Significant bit of Entry 1 | Significant bit of Entry 0 | PRP Entry 1 | PRP Entry 0 |
| 1 | Parity bits | Last entry indication bit | Last entry indication bit | Significant bit of Entry 3 | Significant bit of Entry 2 | PRP Entry 3 | PRP Entry 2 |
| 2 | Parity bits | Last entry indication bit | Last entry indication bit | Significant bit of Entry 5 | Significant bit of Entry 4 | PRP Entry 5 | PRP Entry 4 |
| 3 | Parity bits | Last entry indication bit | Last entry indication bit | Significant bit of Entry 7 | Significant bit of Entry 6 | PRP Entry 7 | PRP Entry 6 |
| 4 | Parity bits | Last entry indication bit | Last entry indication bit | Significant bit of Entry 9 | Significant bit of Entry 8 | PRP Entry 9 | PRP Entry 8 |
| 5 | Parity bits | Blank data | Blank data | Blank data | Significant bit of address | Blank data | Next group of PRP addresses |

Based on the contents of Table 1, the buffer unit may comprise six sequentially arranged subunits 0 to 5. With regard to the first five subunits 0 to 4, each of the subunits stores two PRP address entries, along with the significant bit corresponding to each entry and the last entry indication bit. The significant bit is used to indicate whether the corresponding address entry is valid, and the last entry indication bit is used to indicate whether the corresponding address entry is the last address entry of the corresponding read command, wherein the corresponding read command is the command represented by the command index number in the data unit information corresponding to the address entry. The last subunit 5 stores the host memory address corresponding to the next buffer unit.

By way of example, in the case where the entries stored in the buffer unit are SGL address entries, the structure of the buffer unit may be defined as shown in Table 2 below.

TABLE 2

| Number of Bits | 140:132 | 131 | 130 | 129:97 | 96 | 95:64 | 63:0 |
|---|---|---|---|---|---|---|---|
| 0 | Parity bits | Last entry indication bit | Significant bit | Blank | Bit bucket flag bit | Length of SGL 0 | SGL descriptor 0 |
| 1 | Parity bits | Last entry indication bit | Significant bit | Blank | Bit bucket flag bit | Length of SGL 1 | SGL descriptor 1 |
| 2 | Parity bits | Last entry indication bit | Significant bit | Blank | Bit bucket flag bit | Length of SGL 2 | SGL descriptor 2 |
| 3 | Parity bits | Last entry indication bit | Significant bit | Blank | Bit bucket flag bit | Length of SGL 3 | SGL descriptor 3 |
| 4 | Parity bits | Last entry indication bit | Significant bit | Blank | Bit bucket flag bit | Length of SGL 4 | SGL descriptor 4 |
| 5 | Parity bits | Last entry | Significant bit | Blank | Blank | Number of | Next group of |

TABLE 2-continued

| Number of Bits | 140:132 | 131 | 130 | 129:97 | 96 | 95:64 | 63:0 |
|---|---|---|---|---|---|---|---|
| | | indication bit | bit | | | remaining SGLs | SGL addresses |

Based on the contents of Table 2, the buffer unit may comprise six sequentially arranged subunits 0 to 5. With regard to the first five subunits 0 to 4, each of the subunits stores one SGL address entry, along with the significant bit corresponding to the address entry and the last entry indication bit. The SGL address entry may include the SGL descriptor and the corresponding entry length. The significant bit is used to indicate whether the corresponding address entry is valid, and the last entry indication bit is used to indicate whether the corresponding address entry is the last address entry of the corresponding read command, wherein the corresponding read command is the command represented by the command index number in the data unit information corresponding to the address entry. The last subunit 5 stores the host memory address corresponding to the next buffer unit.

Optionally, the host memory address corresponding to each buffer unit in the embodiment of the present disclosure may be the address of the first address entry in the last subunit. For example, in the case where the address entry is a PRP form, the host memory address in the last subunit is the address where the PRP entry 0 in the next buffer unit is stored in the host memory. In the case where the address entry is an SGL entry, the host memory address in the last subunit is the starting address of the SGL descriptor 0 in the next buffer unit. In one possible implementation, after receiving the data units and the data unit information, the controller may determine candidate buffer units based on the data unit information, and search for an address entry corresponding to the data unit information in each candidate buffer unit based on the data unit information. That is, the controller may use the data unit information as a request for searching for an address entry. The data unit information may further include, in addition to the command index number and the data unit index number, an offset in the data unit, which is used to represent one or more logic block addresses in the data unit.

Optionally, the address entry buffer further comprises a buffer lookup table that includes buffer information corresponding to each buffer unit for determining a candidate buffer unit corresponding to the data unit information during the lookup process. The buffer information may include the command index number, data unit index number, type of the data unit, buffer subunit index number, offset in the data unit, and significant bits. The PRP type and the SGL type of the data unit may be represented by 1 and 0, respectively. The buffer subunit index number is the index number of the first subunit in the buffer unit. When searching for the address entry, the controller compares the content of the data unit information with all the data unit information in a buffer lookup table to determine matched ones.

According to the embodiment of the present disclosure, the two types of host memory address, namely PRP and SGL, may be compatible through the above buffer unit structure, such that the universality of the address entry buffer unit structure is improved and the cost of hardware for realizing address entry buffering is reduced. Further, the content of the data unit information may be compared with the buffered information one by one or in parallel simultaneously. The "type of the address entry" in the buffered information is an identifier to distinguish between PRP and SGL. In the case where the data unit information is used to search for a PRP address entry, since the data pointed to by the PRP is a page with a fixed size and the number of data units corresponding to the PRP is an integer, the buffer unit where the required PRP address entry is located can be found as a candidate buffer unit by comparing the command index number and the data unit index number only. In the case where the data unit information is used to search for an SGL address entry, since the data length represented by the SGL descriptor can be any value, the SGL descriptor may correspond to any offset address in the data unit. Therefore, in the search process, it is necessary to compare the command index number, the data unit index number, and the offset in the data unit to acquire the corresponding address entry. In addition, the buffer information of an SGL contains at most five SGL descriptors, and the storage of a flash memory unit may need to search for multiple pieces of buffer information. Therefore, it is necessary to further compare the buffer subunit index number to accurately find the buffer unit where the target SGL address entry is located as a candidate buffer unit.

Optionally, after the candidate buffer unit is determined by comparison, the corresponding address entry is read in the buffer unit based on the buffer subunit index number of the target PRP address entry or the target SGL address entry, to acquire an address entry for storing the flash memory data unit corresponding to the data unit information.

The step S40 comprises in response to finding an address entry corresponding to the data unit information, transmitting, based on the address entry, each flash memory data unit to a corresponding host memory address in the address entry and storing each flash memory data unit therein.

In one possible implementation, in the case of finding the address entry corresponding to the data unit information, the controller stores each flash memory data unit in the corresponding memory address in the host based on the address entry corresponding to each flash memory data unit. Since different address entries have different formats, for different types of address entries, the controller may determine the memory address corresponding to the flash memory data unit through different search methods.

Optionally, to prevent repeated storage, the address entry in which the flash memory data unit has been stored may be marked after the storage of the flash memory data unit is completed. That is, the controller can clear the significant bits of the address entry corresponding to the flash memory data unit in the buffer unit in response to completion of the storage of the flash memory data unit.

In one possible implementation, when the controller does not find the corresponding address entry in the search process of step S30, it can acquire the corresponding address entry from the host to store the flash memory data unit. That is, in response to not finding the address entry corresponding to the data unit information, the controller can acquire at least one address entry from the host based on the data unit information, and store the at least one address entry and the corresponding data unit information in the address entry buffer. Optionally, the process of acquiring the address entry from the host may be carried out as follows: calculating the host memory address of the corresponding buffer unit in the host based on the data unit information, then acquiring a preset number of adjacent address entries from the host based on the host memory address and a preset acquisition rule, and determining the data unit information corresponding to each address entry. The host memory address of the buffer unit in the host can be determined based on the data unit index number and the offset in the data unit in the data unit information. In one example, being "adjacent" could mean being adjacent in the address. For example, being adjacent may mean that the address of the next group of PRP entry is consecutive to the address of the current group.

Optionally, after determining the host memory address, the controller may determine a empty target buffer unit among the buffer units included in the address entry buffer, and determine the number of address entries based on the memory of the target buffer unit and the memory occupied by each address entry. Starting from the host memory address of the first entry, consecutive address entries of the determined number are sequentially acquired, and data unit information corresponding to each address entry is calculated based on the data unit information corresponding to the host memory address. For example, in the case where ten address entries can be stored in the target buffer unit, ten consecutive address entries can be sequentially acquired starting from the host memory address, and the corresponding data unit information can be calculated based on the address of each address entry.

Optionally, the controller can determine in any way the target buffer unit that needs to store the address entry. For example, the buffer unit in the address entry buffer may have a corresponding buffer unit index number, and the buffer unit index number is in one-to-one correspondence to the slot of the buffer unit. In response to the presence of empty buffer units in the address entry buffer, the controller can determine an empty buffer unit with the smallest buffer unit index number as a target buffer unit. In response to the absence of empty buffer units in the address entry buffer, the controller can define a 1-bit phase value for each buffer unit, clear the buffer unit with the smallest buffer unit index number in the same phase value, and determine the buffer unit as a target buffer unit and invert the phase value of the target buffer unit.

Figure 2:
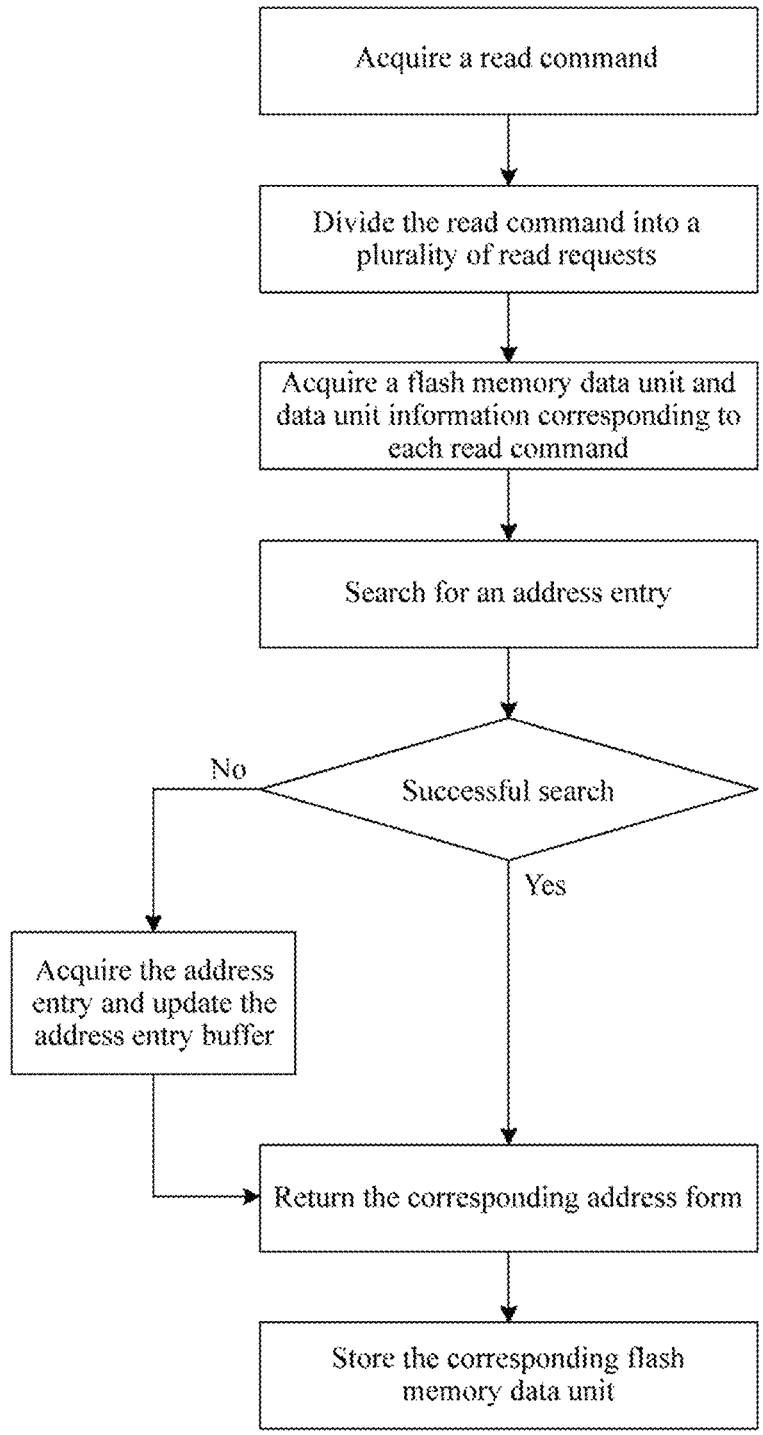
FIG. 2 shows a schematic diagram of a method of processing a read command according to an embodiment of the present disclosure.

FIG. 2 shows a schematic diagram of a method of processing a read command according to an embodiment of the present disclosure. As shown in FIG. 2, after acquiring a read command, a controller according to an embodiment of the present disclosure divides the read command into a plurality of read requests, and executes each of the read requests to acquire a corresponding flash memory data unit and data unit information. The controller further searches for an address entry in an address entry buffer based on the data unit information, and returns the corresponding address entry if the search is successful. When the search fails, a corresponding address entry is acquired from a host, the address entry and a plurality of adjacent address entries are updated to the address entry buffer, and the address entry is returned. After acquiring the address entry corresponding to the data unit information, the flash memory data unit is stored in a host memory address pointed to by the address entry.

Based on the above technical features, the embodiment of the present disclosure can effectively manage the address entries by providing an address entry buffer in the controller, which improves the efficiency of acquiring the address entry corresponding to out-of-order returned data and reduces the delay of the command processing. Moreover, the search for the address entry in the buffer implemented by hardware enables the controller to promptly acquire the address entry, reduces the delay caused by the out-of-order return of data, and improves the overall efficiency of processing the read command. Furthermore, according to the present disclosure, it is only necessary to store part of the address entries, so that little storage space of the controller is occupied and the cost of hardware is low.

Figure 3:
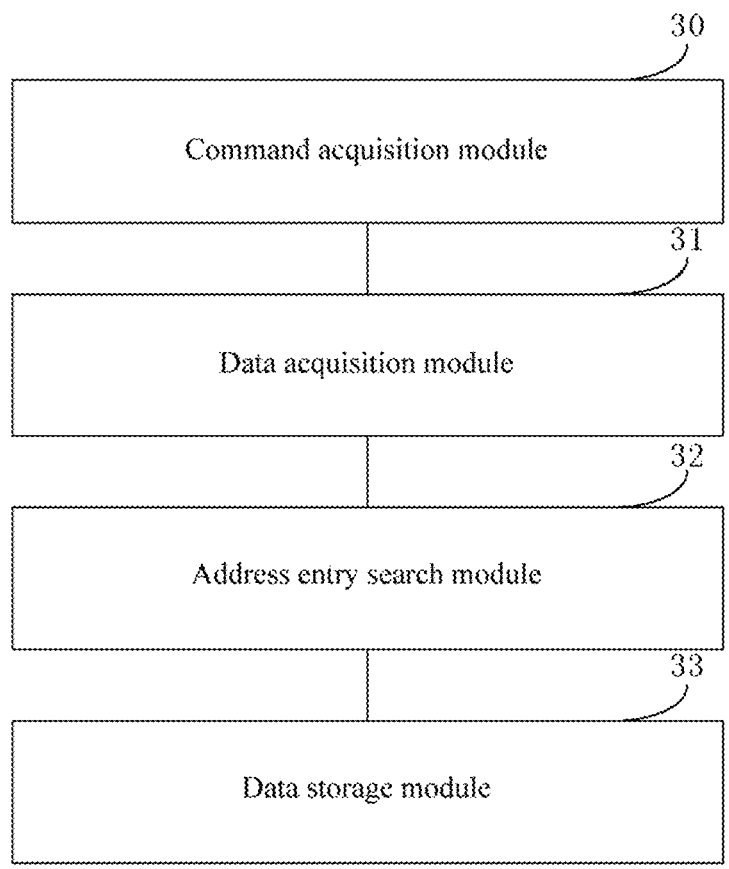
FIG. 3 shows a schematic diagram of a device for processing a read command according to an embodiment of the present disclosure.

FIG. 3 shows a schematic diagram of a device for processing a read command according to an embodiment of the present disclosure. As shown in FIG. 3, the device for processing a read command according to an embodiment of the present disclosure may comprise a command acquisition module 30, a data acquisition module 31, an address entry search module 32, and a data storage module 33 as follows. The command acquisition module 30 is configured to determine at least one read command and a command index number corresponding to each read command. The data acquisition module 31 is configured to acquire at least one flash memory data unit and data unit information corresponding to each read command, the flash memory data unit is configured to represent data read based on the read command, the data unit information comprises a data unit index number and the command index number. The address entry search module 32 is configured to search for an address entry corresponding to the data unit information in an address entry buffer based on the data unit information, the address entry buffer comprises at least one buffer unit, and the buffer unit comprises at least one address entry with corresponding data unit information. The data storage module 33 is configured to, in response to finding an address entry corresponding to the data unit information, transmit the data unit to a corresponding host memory address in the address entry and store the data unit therein, based on the address entry.

In one possible implementation, the command acquisition module 30 comprises:
  a command reading submodule configured to read at least one read command from a host memory;
  a command storage submodule configured to determine a unique corresponding command index number for each read command that has been read, and store the at least one read command and the corresponding command index number in a command buffer; and
  a command acquisition submodule configured to acquire at least one read command and a command index number corresponding to the read command from the command buffer.

In one possible implementation, the data acquisition module 31 comprises:
  a request determination submodule configured to determine at least one read request corresponding to each read command and a data unit index number corresponding to each read request, each read request being configured to acquire a flash memory data unit; and
  a data reading submodule configured to read a corresponding flash memory data unit and data unit information corresponding to the flash memory data unit in a flash memory controller based on a data unit index number and a command index number corresponding to each read request, the data unit information including the data unit index number and the command index number.

In one possible implementation, the buffer unit comprises a corresponding host memory address, and the buffer unit further comprises at least one subunit arranged in order. Each subunit stores at least one address entry, a significant bit, and a last entry indication bit, wherein the last subunit in the buffer unit comprises a host memory address corresponding to the next buffer unit.

In one possible implementation, the address entry search module 32 comprises:
  a unit determination submodule configured to determine a candidate buffer unit based on a host memory address corresponding to the data unit information; and
  an address entry search submodule configured to search for an address entry corresponding to the data unit information in each candidate buffer unit based on the data unit information.

In one possible implementation, the device further comprises:
  a significant bit clearing module configured to clear significant bits of the address entry corresponding to the flash memory data unit in the buffer unit in response to completing storage of the flash memory data unit.

In one possible implementation, the device further comprises:
  an address entry updating module configured to acquire at least one address entry from the host based on the data unit information, and store the at least one address entry and corresponding data unit information in the address entry buffer, in response to not finding an address entry corresponding to the data unit information.

In one possible implementation, the address entry updating module comprises:
  an address determination submodule configured to calculate a host memory address of a corresponding buffer unit in the host based on the data unit information; and
  an address entry acquisition submodule configured to acquire a preset number of adjacent address entries from the host based on the host memory address and a preset acquisition rule, and determine data unit information corresponding to each address entry.

In one possible implementation, the address entry acquisition submodule comprises:
  an index determination unit configured to determine an empty target buffer unit among buffer units included in the address entry buffer, the target buffer unit being configured to store the acquired address entries;
  an entry determination unit configured to determine the number of the address entries based on a memory of the target buffer unit and a memory occupied by each address entry; and
  an entry acquisition unit configured to sequentially acquire consecutive address entries of the determined number, starting entry the host memory address, and calculate data unit information corresponding to each address entry based on data unit information corresponding to the host memory address.

In one possible implementation, the buffer unit in the address entry buffer has a corresponding buffer unit index number, and the buffer unit index number is one-to-one mapped to the location of the buffer unit; and
  the index determination unit comprises:
    a first index determination subunit configured to determine the empty buffer unit with the smallest buffer unit index number as a target buffer unit in response to the presence of empty buffer units in the address entry buffer.

In one possible implementation, the index determination unit comprises:
  a second index determination subunit configured to define a 1-bit phase value for each buffer unit, clear the buffer unit with the smallest buffer unit index number in the same phase value, and determine the buffer unit as a target buffer unit and invert the phase value of the target buffer unit, in response to the absence of empty buffer units in the address entry buffer.

In some embodiments, the device provided by the present disclosure has functions or modules that can be used to execute the method described in the above method embodiment, and the specific implementation of the method can refer to the description of the above method embodiment, which is not repeated here for brevity.

The embodiment of the present disclosure further provides a computer readable storage medium having computer program instructions stored thereon, and when the computer program instructions are executed by a processor, a controller in the processor implements the above method. The computer readable storage medium may be a volatile or nonvolatile computer readable storage medium.

The embodiment of the present disclosure further provides a controller for implementing the above method, which comprises a command control module for storing at least one read command and a corresponding command index number;
  a read command execution module configured to execute the read command and acquire a flash memory data unit and data unit information corresponding to the read command;
  an address entry buffer module comprising at least one buffer unit, each buffer unit being configured to store at least one address entry with corresponding data unit information; and
  an address entry search module configured to search for a corresponding address entry in the address entry buffer module based on the data unit information.

Figure 4:
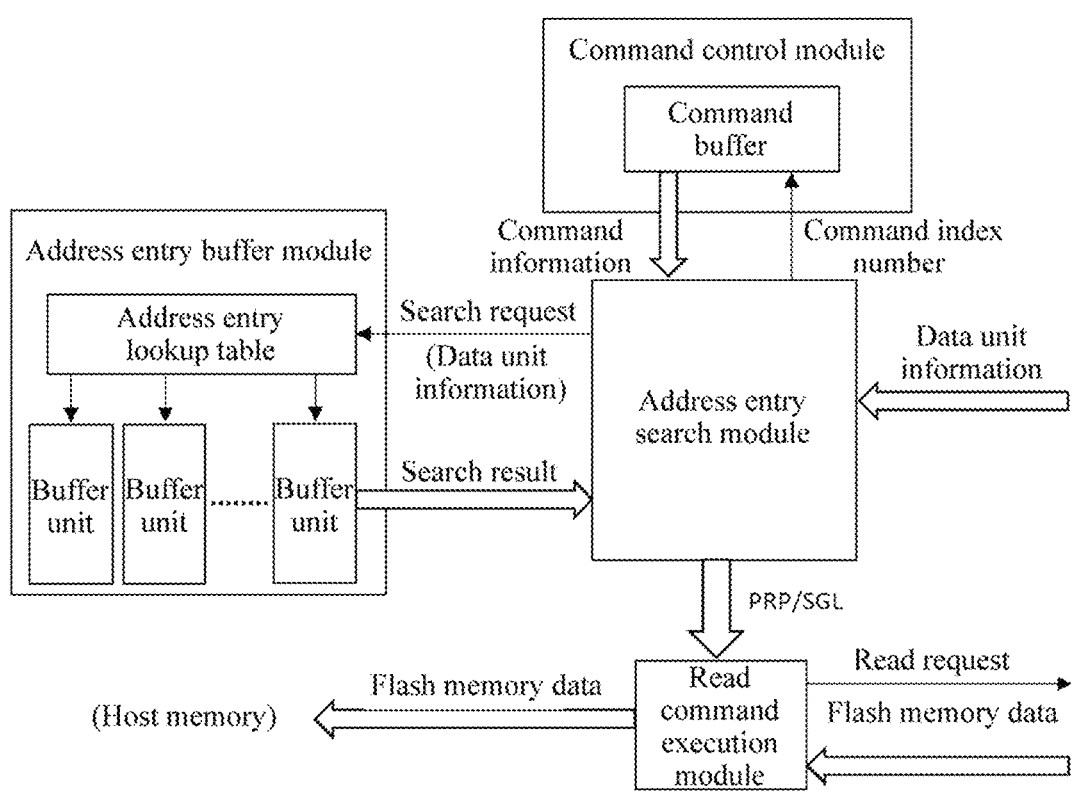
FIG. 4 shows a schematic diagram of a controller according to an embodiment of the present disclosure.

FIG. 4 shows a schematic diagram of a controller according to an embodiment of the present disclosure. As shown in FIG. 4, the controller may comprise a command control module, a read command execution module, an address entry buffer module, and an address entry search module. The command control module may comprise a command buffer for storing at least one read command and a corresponding command index number. The read command execution module is configured to execute the read command and acquire at least one flash memory data unit and data unit information corresponding to the read command from the flash memory, and can also send the flash memory data unit to a corresponding address in the host and store the flash memory data unit therein based on the address entry corresponding to the flash memory data unit. The address entry buffer module comprises at least one buffer unit, and each buffer unit is used for storing at least one address entry with corresponding data unit information. The address entry search module is configured to search for a corresponding address entry in the address entry buffer module based on the data unit information.

The embodiment of the present disclosure further provides a computer program product, comprising a computer readable code, or a nonvolatile computer readable storage medium carrying the computer readable code. When the computer readable code runs in a processor of an electronic apparatus, a controller in the electronic apparatus executes the above method.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logic function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A method of processing a read command, comprising:
   determining at least one read command and a command index number corresponding to each read command;
   acquiring at least one flash memory data unit and data unit information corresponding to the each read command, the flash memory data unit representing data read based on the read command, the data unit information comprising a data unit index number and the command index number;
   searching for an address entry corresponding to the data unit information in an address entry buffer based on the data unit information, the address entry buffer comprising at least one buffer unit, the buffer unit comprising at least one address entry with corresponding data unit information; and
   in response to finding an address entry corresponding to the data unit information, transmitting, based on the address entry, each of the at least one flash memory data unit to a corresponding host memory address in the address entry and storing each of the at least one flash memory data unit in the corresponding space address.

2. The method according to claim 1, wherein determining the at least one read command and the command index number corresponding to the each read command comprises:
   reading at least one read command from a host memory;
   determining a unique corresponding command index number for the each read command that has been read, and storing the at least one read command and the corresponding command index number in a command buffer; and
   acquiring at least one read command and a command index number corresponding to the acquired read command from the command buffer.

3. The method according to claim 1, wherein acquiring the at least one flash memory data unit and the data unit information corresponding to the each read command comprises:
   determining at least one read request corresponding to the each read command and a data unit index number corresponding to each of the at least one read request, each of the at least one read request being configured to acquire a flash memory data unit; and
   reading a corresponding flash memory data unit and data unit information corresponding to the flash memory data unit in a flash memory controller based on a data unit index number and a command index number corresponding to each of the at least one read request, the data unit information comprising the data unit index number and the command index number.

4. The method according to claim 1, wherein the buffer unit has a corresponding host memory address, and the buffer unit further comprises at least one subunit arranged in order; and each of the at least one subunit stores at least one address entry, a significant bit, and a last entry indication bit, wherein a last subunit in the order in the buffer unit comprises a host memory address corresponding to a next buffer unit.

5. The method according to claim 4, wherein searching for the address entry corresponding to the data unit information in the address entry buffer based on the data unit information comprises:
   determining a candidate buffer unit based on a host memory address corresponding to the data unit information; and
   searching for an address entry corresponding to the data unit information in each candidate buffer unit based on the data unit information.

6. The method according to claim 4, wherein the method further comprises:
   in response to completing storage of the flash memory data unit, clearing significant bits of the address entry corresponding to the flash memory data unit in the buffer unit.

7. The method according to claim 1, wherein the method further comprises:
   in response to not finding an address entry corresponding to the data unit information, acquiring at least one address entry from the host based on the data unit information, and storing the at least one address entry and the corresponding data unit information in the address entry buffer.

8. The method according to claim 7, wherein acquiring the at least one address entry from the host based on the data unit information comprises:
   calculating a host memory address of a corresponding buffer unit in the host based on the data unit information; and
   acquiring a preset number of adjacent address entries from the host memory based on the host memory address and a preset acquisition rule, and determining data unit information corresponding to each of the address entries.

9. The method according to claim 8, wherein acquiring the preset number of adjacent address entries from the host based on the host memory address and the preset acquisition rule, and determining the data unit information corresponding to the each of the address entries comprises:
   determining an empty buffer unit among buffer units included in the address entry buffer, the target buffer unit being configured to store the acquired address entries;
   determining a number of the address entries based on a memory of the target buffer unit and a memory occupied by each of the address entries; and
   starting from the host memory address, sequentially acquiring consecutive address entries of the determined number, and calculating data unit information corresponding to each of the address entries based on the data unit information corresponding to the host memory address.

10. The method according to claim 9, wherein a buffer unit in the address entry buffer has a corresponding buffer unit index number, and the buffer unit index number is based on a location of the buffer unit; and
    determining the empty buffer unit among the buffer units included in the address entry buffer comprises:
    in response to presence of empty buffer units in the address entry buffer, determining the empty buffer unit with smallest buffer unit index number as a target buffer unit.

11. The method according to claim 10, wherein determining the empty buffer unit among the buffer units included in the address entry buffer comprises:
    in response to absence of empty buffer units in the address entry buffer, defining a 1-bit phase value for each of the buffer units, clearing a buffer unit with smallest buffer unit index number in same phase value, and determining the buffer unit as a target buffer unit and inverting the phase value of the target buffer unit.

12. A device for processing a read command, comprising:
a command acquisition module configured to determine at least one read command and a command index number corresponding to each read command;
a data acquisition module configured to acquire at least one flash memory data unit and data unit information corresponding to the each read command, the flash memory data unit being configured to represent data read based on the read command, the data unit information comprising a data unit index number and the command index number;
an address entry search module configured to search for an address entry corresponding to the data unit information in an address entry buffer based on the data unit information, the address entry buffer comprising at least one buffer unit, the buffer unit comprising at least one address entry with corresponding data unit information; and
a data storage module configured to, in response to finding an address entry corresponding to the data unit information, transmit, based on the address entry, the data unit to a corresponding host memory address in the address entry and store the data unit in the corresponding host memory address.

13. A controller comprising:
a command control module for storing at least one read command and a corresponding command index number;
a read command execution module configured to execute the read command and acquire a flash memory data unit and data unit information corresponding to the read command, wherein the flash memory data unit represents data read based on the read command, and the data unit information comprises a data unit index number and the command index number;
an address entry buffer module comprising at least one buffer unit, each of the at least one buffer unit being configured to store at least one address entry with corresponding data unit information; and
an address entry search module configured to search for a corresponding address entry in the address entry buffer module based on the data unit information.

14. A nonvolatile computer readable storage medium on which computer program instructions are stored, wherein when the computer program instructions are executed by a processor, a controller in the processor implements operations of processing a read command, wherein the operations comprise:
determining at least one read command and a command index number corresponding to each read command;
acquiring at least one flash memory data unit and data unit information corresponding to the each read command, the flash memory data unit representing data read based on the read command, the data unit information comprising a data unit index number and the command index number;
searching for an address entry corresponding to the data unit information in an address entry buffer based on the data unit information, the address entry buffer comprising at least one buffer unit, the buffer unit comprising at least one address entry with corresponding data unit information; and
in response to finding an address entry corresponding to the data unit information, transmitting, based on the address entry, each of the at least one flash memory data unit to a corresponding space address in the address entry and storing each of the at least one flash memory data unit in the corresponding space address.

15. The computer readable storage medium according to claim 14, wherein determining the at least one read command and the command index number corresponding to the each read command comprises:
reading at least one read command from a host memory;
determining a unique corresponding command index number for the each read command that has been read, and storing the at least one read command and the corresponding command index number in a command buffer; and
acquiring at least one read command and a command index number corresponding to the acquired read command from the command buffer.

16. The computer readable storage medium according to claim 14, wherein acquiring the at least one flash memory data unit and the data unit information corresponding to the each read command comprises:
determining at least one read request corresponding to the each read command and a data unit index number corresponding to each of the at least one read request, each of the at least one read request being configured to acquire a flash memory data unit; and
reading a corresponding flash memory data unit and data unit information corresponding to the flash memory data unit in a flash memory controller based on a data unit index number and a command index number corresponding to each of the at least one read request, the data unit information comprising the data unit index number and the command index number.

17. The computer readable storage medium according to claim 14, wherein the buffer unit has a corresponding host memory address, and the buffer unit further comprises at least one subunit arranged in order; and each of the at least one subunit stores at least one address entry, a significant bit, and a last entry indication bit, wherein a last subunit in the order in the buffer unit comprises a host memory address corresponding to a next buffer unit.

18. The computer readable storage medium according to claim 17, wherein searching for the address entry corresponding to the data unit information in the address entry buffer based on the data unit information comprises:
determining a candidate buffer unit based on a host memory address corresponding to the data unit information; and
searching for an address entry corresponding to the data unit information in each candidate buffer unit based on the data unit information.

19. The computer readable storage medium according to claim 17, wherein the operations further comprise:
in response to completing storage of the flash memory data unit, clearing significant bits of the address entry corresponding to the flash memory data unit in the buffer unit.

20. The computer readable storage medium according to claim 14, wherein the method further comprises:
in response to not finding an address entry corresponding to the data unit information, acquiring at least one address entry from the host based on the data unit information, and storing the at least one address entry and the corresponding data unit information in the address entry buffer.

* * * * *